(12) United States Patent
Boemler

(10) Patent No.: US 11,894,670 B2
(45) Date of Patent: Feb. 6, 2024

(54) HIGH-ENERGY SUPPRESSION FOR INFRARED IMAGERS OR OTHER IMAGING DEVICES

(71) Applicant: Raytheon Company, Waltham, MA (US)

(72) Inventor: Christian M. Boemler, Goleta, CA (US)

(73) Assignee: Raytheon Company, Tewksbury, MA (US)

( * ) Notice: Subject to any disclaimer, the term of this patent is extended or adjusted under 35 U.S.C. 154(b) by 149 days.

(21) Appl. No.: 17/480,554

(22) Filed: Sep. 21, 2021

(65) Prior Publication Data

US 2023/0095511 A1 Mar. 30, 2023

(51) Int. Cl.
*H02H 3/20* (2006.01)
*G01J 1/44* (2006.01)
*G01J 1/02* (2006.01)

(52) U.S. Cl.
CPC ............... *H02H 3/20* (2013.01); *G01J 1/44* (2013.01); *G01J 2001/0276* (2013.01)

(58) Field of Classification Search
CPC ....... H02H 3/20; G01J 1/44; G01J 2001/0276
USPC .......................................................... 361/86
See application file for complete search history.

(56) References Cited

U.S. PATENT DOCUMENTS

| | | | |
|---|---|---|---|
| 6,252,462 B1 | 6/2001 | Hoffman | |
| 6,885,002 B1 | 4/2005 | Finch et al. | |
| 6,927,796 B2 | 8/2005 | Liu et al. | |
| 7,148,727 B2 | 12/2006 | Van Bogget | |
| 9,628,105 B1 | 4/2017 | Veeder | |
| 10,242,268 B2 | 3/2019 | Harris et al. | |
| 2003/0150979 A1* | 8/2003 | Lauffenburger | G01J 1/44 250/214 R |
| 2005/0199813 A1* | 9/2005 | Van Bogget | H03F 3/45977 250/338.1 |
| 2008/0106297 A1* | 5/2008 | Jao | H03K 17/164 326/27 |

(Continued)

FOREIGN PATENT DOCUMENTS

TW    I287818 B  * 10/2007

OTHER PUBLICATIONS

Abbasi et al., "A PFM-Based Digital Pixel With an Off-Pixel Residue Measurement for Small Pitch FPAs", IEEE Transactions on Circuits and Systems—II: Express Briefs, vol. 64, No. 8, Aug. 2017, 5 pages.

(Continued)

*Primary Examiner* — Thienvu V Tran
*Assistant Examiner* — Sreeya Sreevatsa

(57) ABSTRACT

An apparatus includes a photodetector configured to generate an electrical current based on received illumination. The apparatus also includes an integration capacitor configured to integrate the electrical current and generate an integrator voltage. The apparatus further includes an amplifier configured to control a transistor switch coupled in series between the photodetector and the integration capacitor. The apparatus also includes an event detector configured to sense a high-energy event affecting the photodetector. In addition, the apparatus includes a switchable clamp coupled across inputs of the amplifier, where the event detector is configured to close the switchable clamp in response to sensing the high-energy event.

20 Claims, 5 Drawing Sheets

(56) References Cited

U.S. PATENT DOCUMENTS

| | | | |
|---|---|---|---|
| 2011/0221520 A1* | 9/2011 | Bales | H03F 3/005 |
| | | | 341/155 |
| 2012/0261553 A1* | 10/2012 | Elkind | H04N 25/00 |
| | | | 250/208.1 |
| 2012/0305786 A1* | 12/2012 | Dierickx | G01J 1/44 |
| | | | 250/371 |
| 2017/0205283 A1* | 7/2017 | Wyles | G01J 1/44 |
| 2018/0124336 A1* | 5/2018 | Jonas | H04N 25/772 |
| 2019/0313046 A1 | 10/2019 | McGee, III et al. | |
| 2019/0335118 A1* | 10/2019 | Simolon | H04N 25/772 |

OTHER PUBLICATIONS

Bisiaux et al., "A 14-b Two-step Inverter-based ΣΔ ADC for CMOS Image Sensor", 15th IEEE International New Circuits and Systems Conference, Nov. 2017, 4 pages.

Cantrell, "Digital Pixel Comparator With Bloom Transistor Frontend", U.S. Appl. No. 17/216,481, filed Mar. 29, 2021, 38 pages.

Kean et al., "High-Energy Suppression for Capacitor Transimpedance Amplifier (CTIA)-Based Imagers or Other Imaging Devices," U.S. Appl. No. 17/649,994, filed Feb. 4, 2022, 30 pages.

Kean, "Artifact Mitigation in Capacitor Transimpedance Amplifier (CTIA)-Based Imagers Or Other Imaging Devices," U.S. Appl. No. 18/165,663, filed Feb. 7, 2023, 36 pages.

Kean, "High Flux Detection and Imaging Using Capacitor Transimpedance Amplifier (CTIA)-Based Unit Cells in Imaging Devices," U.S. Appl. No. 18/165,713, filed Feb. 7, 2023, 49 pages.

Notice of Allowance dated Mar. 15, 2023 in connection with U.S. Appl. No. 17/649,994, 9 pages.

\* cited by examiner

HIGH-ENERGY SUPPRESSION FOR INFRARED IMAGERS OR OTHER IMAGING DEVICES

TECHNICAL FIELD

This disclosure relates generally to imaging systems. More specifically, this disclosure relates to high-energy suppression for infrared imagers or other imaging devices.

BACKGROUND

Digital imaging systems often use integration capacitors and comparators to capture information when generating digital images. For example, an electrical current from a pixel can be used to charge an integration capacitor, and a comparator can be used to compare the electrical charge stored on the integration capacitor to a reference voltage. Once the electrical charge stored on the integration capacitor meets or exceeds the reference voltage, the integration capacitor can be reset (discharged), and the process can be repeated. The number of times that the integration capacitor is charged to the reference voltage during an image capture operation can be counted and used to generate image data for that pixel. This process can be performed for each pixel in an imaging array in order to generate image data for the array.

SUMMARY

This disclosure relates to high-energy suppression for infrared imagers or other imaging devices.

In a first embodiment, an apparatus includes a photodetector configured to generate an electrical current based on received illumination. The apparatus also includes an integration capacitor configured to integrate the electrical current and generate an integrator voltage. The apparatus further includes an amplifier configured to control a transistor switch coupled in series between the photodetector and the integration capacitor. The apparatus also includes an event detector configured to sense a high-energy event affecting the photodetector. In addition, the apparatus includes a switchable clamp coupled across inputs of the amplifier, where the event detector is configured to close the switchable clamp in response to sensing the high-energy event.

In a second embodiment, a system includes a focal plane array having multiple optical detectors. Each optical detector includes a photodetector configured to generate an electrical current based on received illumination. Each optical detector also includes an integration capacitor configured to integrate the electrical current and generate an integrator voltage. Each optical detector further includes an amplifier configured to control a transistor switch coupled in series between the photodetector and the integration capacitor. Each optical detector also includes an event detector configured to sense a high-energy event affecting the photodetector. In addition, each optical detector includes a switchable clamp coupled across inputs of the amplifier, where the event detector is configured to close the switchable clamp in response to sensing the high-energy event.

In a third embodiment, a method includes generating an electrical current based on received illumination using a photodetector. The method also includes integrating the electrical current to generate an integrator voltage using an integration capacitor. The method further includes controlling a transistor switch coupled in series between the photodetector and the integration capacitor using an amplifier. In addition, the method includes sensing a high-energy event affecting the photodetector and, in response to sensing the high-energy event, closing a switchable clamp coupled across inputs of the amplifier.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
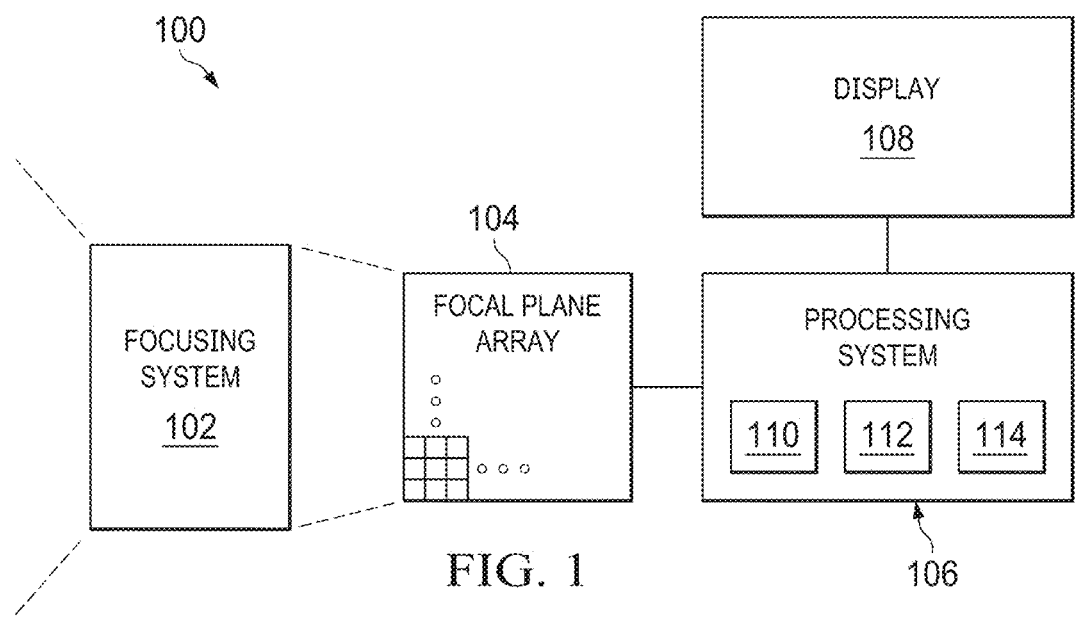
FIG. 1 illustrates an example system supporting high-energy suppression for at least one infrared imager or other imaging device according to this disclosure.

FIGS. 1 through 6, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, digital imaging systems often use integration capacitors and comparators to capture information when generating digital images. For example, an electrical current from a pixel can be used to charge an integration capacitor, and a comparator can be used to compare the electrical charge stored on the integration capacitor to a reference voltage. Once the electrical charge stored on the integration capacitor meets or exceeds the reference voltage, the integration capacitor can be reset (discharged), and the process can be repeated. The number of times that the integration capacitor is charged to the reference voltage during an image capture operation can be counted and used to generate image data for that pixel. This process can be performed for each pixel in an imaging array in order to generate image data for the array.

Some digital imaging systems are intended for use in harsh environments where large transient energy spikes may impact the imaging systems. For example, satellites used in space may be subjected to transient energy spikes caused by natural or manmade phenomena, such as when an adversary directs laser energy at a satellite. As another example, some robotic systems or other systems may be designed for use in radioactive environments or other environments where large amounts of nuclear radiation may strike the systems. These types of energy may be broadly referred to environmental noise, which can refer to any energy that interferes with digital imaging systems (including laser energy, gamma radiation, x-rays, ultraviolet energy, or other electromagnetic energy). Unfortunately, digital imaging systems are often highly susceptible to transient energy spikes, which may cause blooming or elevated dark current effects in pixels of the imaging systems or which may overwhelm the limited charging capacities of the integration capacitors in the imaging systems.

Approaches for combatting the effects of energy spikes in digital imaging systems often consume large amounts of power, which can cause thermal issues or other problems in the imaging systems. Also, these approaches typically rely on very precise tunings of analog biasing conditions and/or may be highly susceptible to fabrication process mismatches. Fabrication process mismatches become increasingly important for very large format digital imaging arrays (such as those with one million pixels or more) and for imaging systems having small pixel sizes (such as those with pixel sizes of 30 µm or less). In addition, these approaches are often designed to handle either very small charge events or very large charge events (but not both types of events).

This disclosure provides circuits that support high-energy suppression for infrared imagers or other imaging devices. As described in more detail below, various circuit elements are provided and used with buffer direct injection (BDI) imaging architectures or other imaging architectures. Each of multiple optical detectors in an imaging device includes an integration capacitor that is charged based on electrical current from a photodiode or other pixel and a comparator that compares the stored capacitor charge to a threshold value. In each optical detector, an amplifier is used to control a transistor switch that is coupled in series between the pixel and the integration capacitor in that optical detector. For smaller energy events, each optical detector may include a de-bias protection diode that is coupled to the output of the amplifier in that optical detector. Each de-bias protection diode can be used to help prevent de-biasing of the associated pixel. For larger energy events, each optical detector may include an event detector and a switchable clamp coupled across the inputs of the amplifier in that optical detector. When an event detector detects a high-energy event, the associated switchable clamp can be closed to short-circuit the inputs of the amplifier for that optical detector, which can help prevent excessive amounts of electrical energy from reaching the integration capacitor in that optical detector. Note that the de-bias protection diodes can also be used during the larger energy events to help prevent de-biasing of the pixels.

In this way, the de-bias protection diodes can be used to help prevent de-biasing of pixels, which enables faster recovery of an imaging system in response to a high-energy event. Also, the switchable clamps can be used to maintain suitable reverse bias voltages for the pixels by quickly draining away excess charges from the pixels, which helps to divert large electrical charges away from the integration capacitors. As a result, these circuit elements can be used to support imaging system data readout that is tolerant to high-energy effects and that allows for excellent imaging during high-energy conditions. Moreover, these circuit elements support high-energy suppression during events having a wide range of energy levels. In addition, these circuit elements allow high-energy suppression to be achieved using small, low-power circuits.

FIG. 1 illustrates an example system 100 supporting high-energy suppression for at least one infrared imager or other imaging device according to this disclosure. As shown in FIG. 1, the system 100 includes a focusing system 102, a focal plane array 104, and a processing system 106. The focusing system 102 generally operates to focus illumination from a scene onto the focal plane array 104. The focusing system 102 may have any suitable field of view that is directed onto the focal plane array 104. The focusing system 102 includes any suitable structure(s) configured to focus illumination, such as one or more lenses, mirrors, or other optical devices.

The focal plane array 104 generally operates to capture image data related to a scene. For example, the focal plane array 104 may include a matrix or other collection of optical detectors that generate electrical signals representing a scene, as well as other components that process the electrical signals. Several of the optical detectors are shown in FIG. 1, although the size of the optical detectors is exaggerated for convenience here. The focal plane array 104 may capture image data in any suitable spectrum or spectra, such as in the visible, infrared, or ultraviolet spectrum. The focal plane array 104 may also have any suitable resolution, such as when the focal plane array 104 includes a collection of approximately 1,000 optical detectors by approximately 1,000 optical detectors (although other collection sizes may be used). The focal plane array 104 includes any suitable collection of optical detectors configured to capture image data. The focal plane array 104 may also include additional components that facilitate the receipt and output of information, such as readout integrated circuits (ROICs).

As described in more detail below, the optical detectors of the focal plane array 104 include pixels (such as photodiodes) that capture illumination from a scene and generate electrical currents. For each pixel, the electrical current of the pixel is used to charge an integration capacitor, a comparator is used to compare the voltage stored on the integration capacitor to a reference voltage, and an amplifier is used to control a transistor switch that is coupled in series between the pixel and the integration capacitor. The integration capacitor can be reset (discharged) once the voltage stored on the integration capacitor meets or exceeds the reference voltage, and this process may be repeated any number of times during an image capture operation. Each optical detector of the focal plane array 104 may also include a de-bias protection diode coupled to the output of the associated amplifier, where the de-bias protection diode may be used to help prevent de-biasing of the associated pixel. Each optical detector of the focal plane array 104 may further include an event detector and a switchable clamp coupled across the inputs of the associated amplifier, where the switchable clamp can be closed to short-circuit the inputs of the amplifier and help prevent an excessive amount of electrical energy from reaching the associated integration capacitor.

The processing system 106 receives outputs from the focal plane array 104 and processes the information. For example, the processing system 106 may process image data generated by the focal plane array 104 in order to generate visual images for presentation to one or more personnel, such as on a display 108. However, the processing system 106 may use the image data generated by the focal plane array 104 in any other suitable manner. The processing system 106 includes any suitable structure configured to process information from a focal plane array or other imaging system. For instance, the processing system 106 may include one or more processing devices 110, such as one or more microprocessors, microcontrollers, digital signal processors, field programmable gate arrays, application specific integrated circuits, or discrete logic devices. The processing system 106 may also include one or more memories 112, such as a random access memory, read only memory, hard drive, Flash memory, optical disc, or other suitable volatile or non-volatile storage device(s). The processing system 106 may further include one or more interfaces 114 that support communications with other systems or devices, such as a network interface card or a wireless transceiver facilitating communications over a wired or wireless network or a direct connection. The display 108 includes any suitable device configured to graphically present information.

Although FIG. 1 illustrates one example of a system 100 supporting high-energy suppression for at least one infrared imager or other imaging device, various changes may be made to FIG. 1. For example, various components in FIG. 1 may be combined, further subdivided, replicated, omitted, or rearranged and additional components may be added according to particular needs. Also, FIG. 1 illustrates one example type of system in which high-energy suppression for an imaging device may be used. However, this functionality may be used in any other suitable device or system.

Figure 2:
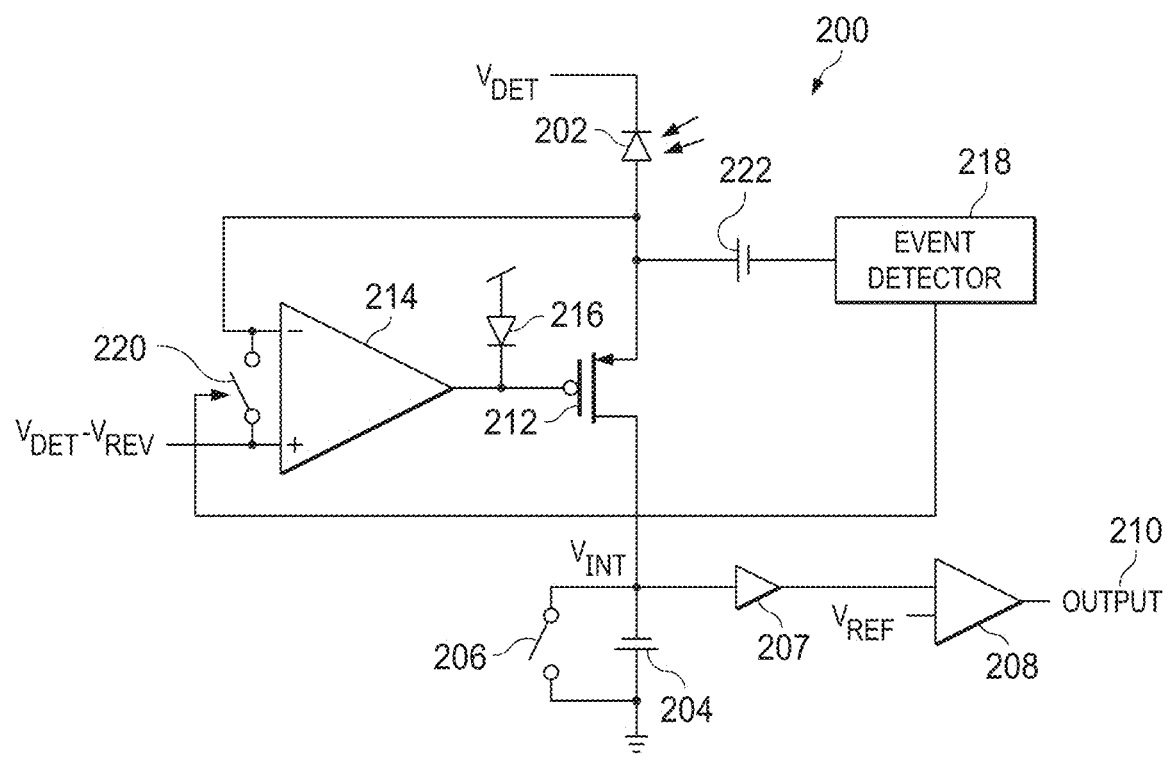
FIG. 2 illustrates an example circuit supporting high-energy suppression for an infrared imager or other imaging device according to this disclosure.

FIG. 2 illustrates an example circuit 200 supporting high-energy suppression for an infrared imager or other imaging device according to this disclosure. An instance of the circuit 200 shown in FIG. 2 may, for example, represent (or be used as at least part of) each optical detector of the focal plane array 104 in the system 100 shown in FIG. 1. Thus, different optical detectors of the focal plane array 104 may include different instances of the circuit 200 shown in FIG. 2. However, any number of the circuits 200 may be used with any other suitable device and in any other suitable system.

As shown in FIG. 2, the circuit 200 includes a pixel in the form of a photodetector 202, which generally operates to produce an electrical current based on received illumination. The photodetector 202 includes any suitable structure configured to generate an electrical current based on received illumination, such as a photodiode. In some cases, the photodetector 202 may represent a photodiode or other structure that can sense illumination in a specified wavelength range or band, such as in the visible, infrared, or ultraviolet spectrum. The photodetector 202 here is coupled to receive a detector voltage $V_{Det}$, which may be provided by any suitable voltage source.

An integration capacitor 204 is coupled in series with the photodetector 202, and the integration capacitor 204 integrates the electrical current generated by the photodetector 202 over a period of time in order to produce an integrator voltage $V_{Int}$. The integration capacitor 204 can also be reset when a switch 206 coupled in parallel across the integration capacitor 204 is closed, thereby coupling both ends of the integration capacitor 204 to ground. The integration capacitor 204 includes any suitable structure configured to integrate an electrical signal. The switch 206 represents any suitable structure configured to selectively form and break an electrical connection, such as a transistor.

The integrator voltage $V_{Int}$ generated by the integration capacitor 204 may be provided to a voltage buffer 207, which can buffer the voltage and provide the buffered voltage to a comparator 208. The comparator 208 generally operates to compare the integrator voltage $V_{Int}$ to a reference voltage $V_{Ref}$ in order to generate a digital output signal 210. The reference voltage $V_{Ref}$ may be provided by any suitable voltage source. The digital output signal 210 indicates whether or not the integrator voltage Vin t meets or exceeds the reference voltage $V_{Ref}$. For instance, the comparator 208 may generate a logic low value (a "zero") in the digital output signal 210 if the integrator voltage $V_{Int}$ does not exceed the reference voltage $V_{Ref}$ or a logic high value (a "one") in the digital output signal 210 if the integrator voltage $V_{Int}$ meets or exceeds the reference voltage $V_{Ref}$. The comparator 208 includes any suitable structure configured to compare voltages and generate comparison results. In some cases, the comparator 208 can be designed with hysteresis to reduce or eliminate ambiguities of detecting falling and rising edges in the integrator voltage $V_{Int}$.

In some embodiments, the output signal 210 may be used to control the operation of the switch 206. For example, when the integrator voltage $V_{Int}$ remains below the reference voltage $V_{Ref}$, the digital output signal 210 may remain at one value (such as low), which can keep the switch 206 opened. Once the comparator 208 determines that the integrator voltage Vin t meets or exceeds the reference voltage $V_{Ref}$ and toggles the digital output signal 210 (such as from low to high), the toggled output signal 210 can cause the switch 206 to close. This causes the integration capacitor 204 to discharge and resets the integrator voltage $V_{Int}$ to a zero or substantially zero voltage. This change in the integrator voltage $V_{Int}$ causes the comparator 208 to toggle its output signal 210 again (such as from high to low) since the integrator voltage $V_{Int}$ no longer exceeds the reference voltage $V_{Ref}$. At that point, the integration capacitor 204 can begin charging again, and the process can be repeated.

The digital output signal 210 generated by the comparator 208 may be provided to any suitable destination, such as a counter or logic in the processing system 106. For example, the counter may count the number of low-to-high transitions in the digital output signal 210 in order to identify a measure of the illumination captured by the photodetector 202. The digital output signal 210 may be used in any other suitable manner to generate image-related data.

In this example, a transistor switch 212 is coupled in series between the photodetector 202 and the integration capacitor 204. The transistor switch 212 thereby controls the conduction of the electrical current from the photodetector 202 to the integration capacitor 204. An amplifier 214 is coupled to the gate of the transistor switch 212 and controls whether the transistor switch 212 is conductive (allowing electrical current to flow between the photodetector 202 and the integration capacitor 204) or non-conductive (blocking electrical current from flowing between the photodetector 202 and the integration capacitor 204). In this example, the amplifier 214 operates based on a voltage output from the photodetector 202 and a voltage that represents the detector voltage $V_{Det}$ minus a reverse bias voltage $V_{Rev}$. This helps to maintain the critical diode reverse bias voltage of the photodetector 202.

During a high-energy event, a rapid surge of electrical current from the photodetector 202 can cause a regulation loop (formed using the amplifier 214) to fail, which may otherwise cause the amplifier 214 to rail at its supply voltage for an extended period of time. As a result, during this time, the photodetector 202 may be subjected to a wrong reverse bias voltage, and the photodetector 202 would not be usable in terms of accumulating an intended photo-charge. Worse, in some cases, the photodetector 202 itself may start to emit photons, such as due to electron emission (blooming) and/or light emitting diode (LED) operation.

The circuit 200 here includes two mechanisms for handling high-energy events. One mechanism includes a de-bias protection diode 216 (also called a slew-limiting diode) that is coupled to the output of the amplifier 214 and to the gate of the transistor switch 212. The de-bias protection diode 216 generally operates to limit the slew rate of the signal that is generated by the amplifier 214 for the gate of the transistor switch 212. This can help to prevent the regulation loop from going too far out of regulation when a high-energy event occurs, which enables faster recovery from the high-energy event. Note that during this time, the electrical current from the photodetector 202 may still be integrated, but the bias of the photodetector 202 is maintained for proper operation of the circuit 200.

For higher-energy events, another mechanism includes an energy event detector 218 and a switchable clamp 220 that is coupled across the inputs of the amplifier 214. The energy event detector 218 is configured to detect high-energy events, such as by comparing a voltage stored on a capacitor 222 coupled to the output of the photodetector 202 to a specified reference voltage (which can be set to identify the threshold energy level at which a high-energy event is detected). The switchable clamp 220 can be used to selectively form and break an electrical connection between the inputs of the amplifier 214. The energy event detector 218 includes any suitable structure configured to detect an input indicative of a high-energy event, such as a high-speed differentiator and comparator with a diode reset. The switchable clamp 220 includes any suitable structure configured to selectively form and break an electrical connection, such as a transistor or other switch.

In response to the energy event detector 218 detecting a sharp increase in the detector bias of the photodetector 202, the energy event detector 218 can quickly create a short clamping pulse that causes the switchable clamp 220 to close. Closing the switchable clamp 220 during a high-energy event prevents the bulk of the electrical current generated by the photodetector 202 from reaching the integration capacitor 204. This also helps to maintain the intended reverse bias voltage of the photodetector 202. Note that during events detected by the energy event detector 218, the de-bias protection diode 216 can also be used to limit the slew rate of the signal that is generated by the amplifier 214 and provided to the gate of the transistor switch 212. Again, this can help to prevent the regulation loop from going too far out of regulation when a high-energy event occurs.

In this way, the circuit 200 is able to provide high-energy suppression in an optical detector of an imaging system. Moreover, this suppression can be achieved over a wide range of energy levels. Multiple instances of the circuit 200 can be used to provide high-energy suppression in multiple optical detectors of the imaging system. Overall, this can help to enable rapid recovery of the imaging system from high-energy events and improved operation of the imaging system during the high-energy events.

Although FIG. 2 illustrates one example of a circuit 200 supporting high-energy suppression for an infrared imager or other imaging device, various changes may be made to FIG. 2. For example, architectures other than a buffer direct injection architecture may be used. Also, while the de-bias protection diode 216 is described as being used with the energy event detector 218 and switchable clamp 220 in the circuit 200, the de-bias protection diode 216 may be used in a circuit without the energy event detector 218 and switchable clamp 220, or the energy event detector 218 and switchable clamp 220 may be used in a circuit without the de-bias protection diode 216.

Figure 3A:
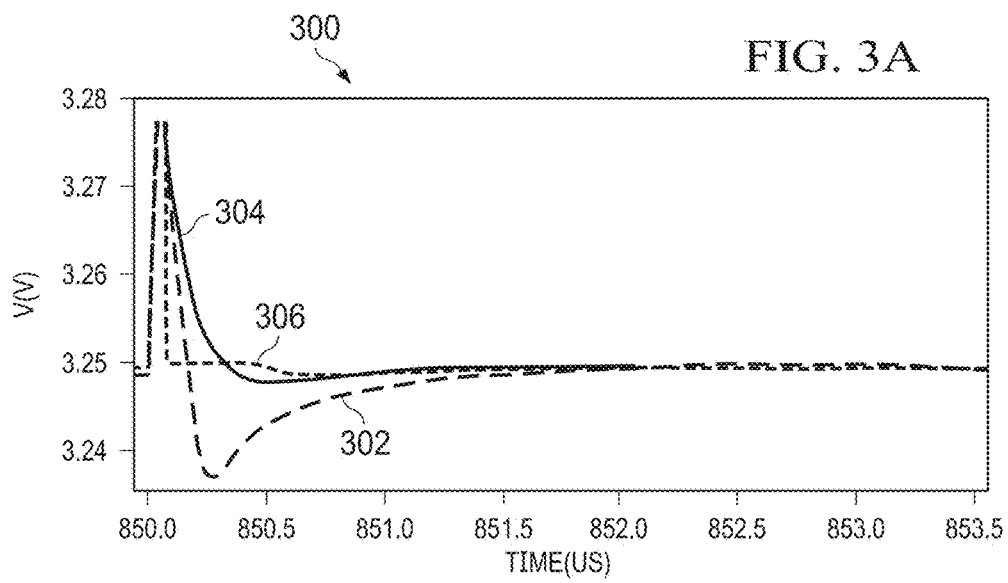
FIGS. 3A through 3C illustrate first example results obtained using high-energy suppression for at least one infrared imager or other imaging device according to this disclosure.
Figure 3B:
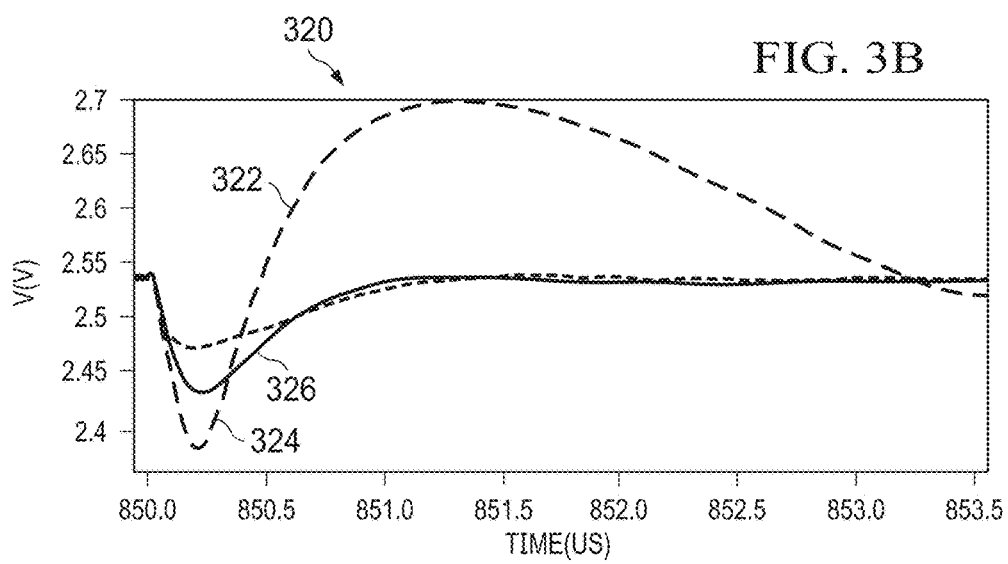
Figure 3C:
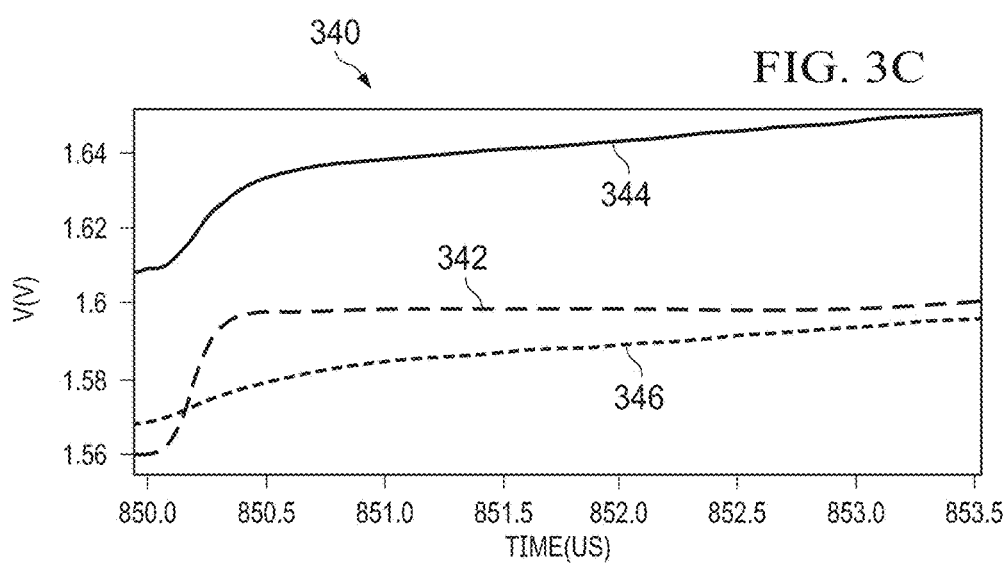

FIGS. 3A through 3C illustrate first example results obtained using high-energy suppression for at least one infrared imager or other imaging device according to this disclosure. More specifically, FIGS. 3A through 3C illustrate example results that may be obtained by the circuit 200 during a high-energy event having a relatively low energy level (relative to other events), such as a pulse of about 50 ke$^-$. As shown here, FIG. 3A contains a graph 300 showing the electrical current generated by the photodetector 202. In FIG. 3A, a line 302 represents the electrical current generated by the photodetector 202 without the de-bias protection diode 216 or the energy event detector 218 and switchable clamp 220. Also, a line 304 represents the electrical current generated by the photodetector 202 with the de-bias protection diode 216 but without the energy event detector 218 and switchable clamp 220. In addition, a line 306 represents the electrical current generated by the photodetector 202 with the de-bias protection diode 216 and with the energy event detector 218 and switchable clamp 220.

Similarly, FIG. 3B contains a graph 320 showing the output of the amplifier 214 based on the electrical current generated by the photodetector 202. In FIG. 3B, a line 322 represents the output of the amplifier 214 without the de-bias protection diode 216 or the energy event detector 218 and switchable clamp 220. Also, a line 324 represents the output of the amplifier 214 with the de-bias protection diode 216 but without the energy event detector 218 and switchable clamp 220. In addition, a line 326 represents the output of the amplifier 214 with the de-bias protection diode 216 and with the energy event detector 218 and switchable clamp 220.

In addition, FIG. 3C contains a graph 340 showing the integrator voltage $V_{Int}$ based on the electrical current generated by the photodetector 202. In FIG. 3C, a line 342 represents the integrator voltage $V_{Int}$ without the de-bias protection diode 216 or the energy event detector 218 and switchable clamp 220. Also, a line 344 represents the integrator voltage $V_{Int}$ with the de-bias protection diode 216 but without the energy event detector 218 and switchable clamp 220. In addition, a line 346 represents the integrator voltage $V_{Int}$ with the de-bias protection diode 216 and with the energy event detector 218 and switchable clamp 220.

As can be seen here, these results indicate that the presence of the de-bias protection diode 216 can prevent severe de-biasing of the circuit 200 after a high-energy event. Moreover, when both the de-bias protection diode 216 and the energy event detector 218 and switchable clamp 220 are used, the bias of the photodetector 202 settles very quickly, the output of the amplifier 214 does not wander far, and the integrator voltage $V_{Int}$ moves only slightly and settles very quickly to the background slope.

Figure 4A:
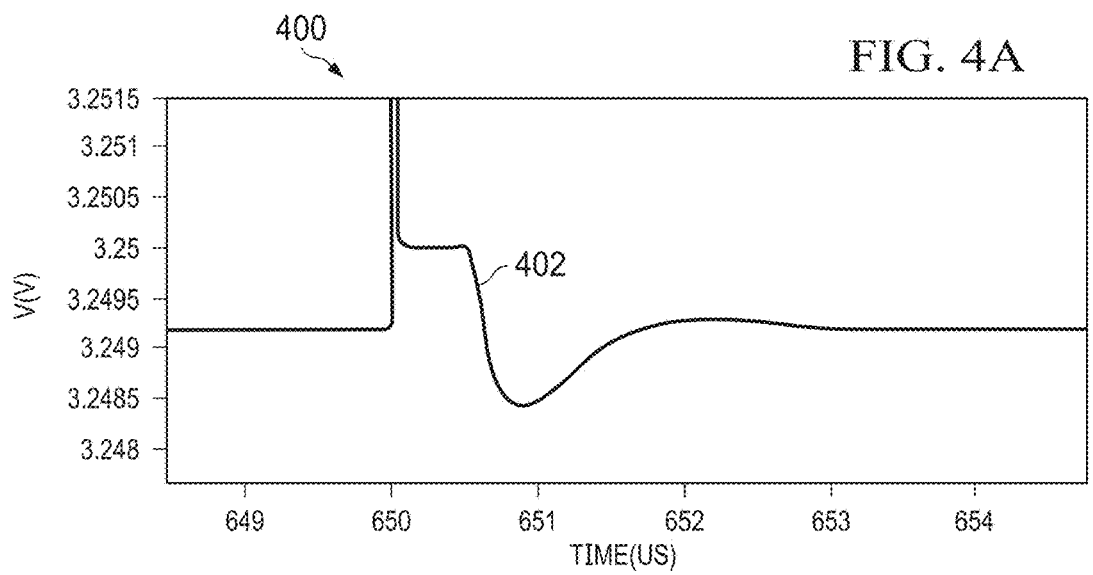
FIGS. 4A through 4C illustrate second example results obtained using high-energy suppression for at least one infrared imager or other imaging device according to this disclosure.
Figure 4B:
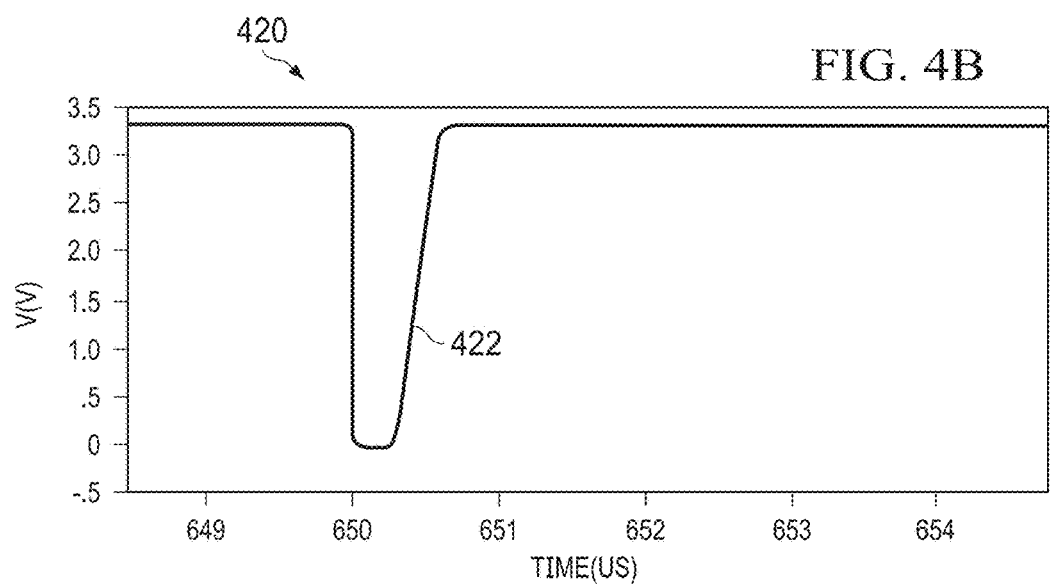
Figure 4C:
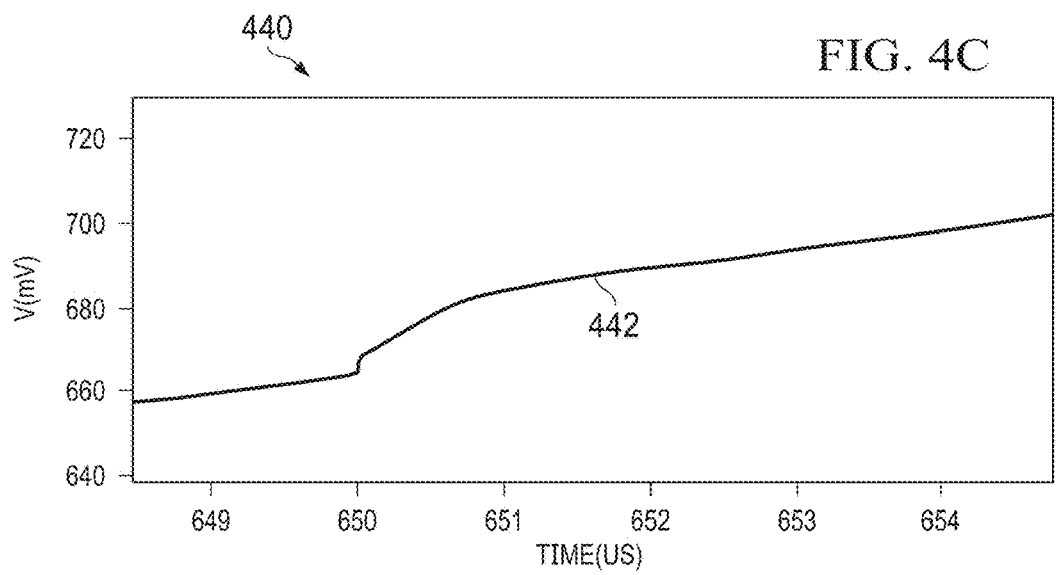

FIGS. 4A through 4C illustrate second example results obtained using high-energy suppression for at least one infrared imager or other imaging device according to this disclosure. More specifically, FIGS. 4A through 4C illustrate example results that may be obtained by the circuit 200 during a high-energy event having a relatively high energy level (relative to other events), such as a pulse of about 1 Me$^-$. As shown here, FIG. 4A contains a graph 400 with a line 402 showing the electrical current generated by the photodetector 202, FIG. 4B contains a graph 420 with a line 422 showing the output of the energy event detector 218, and FIG. 4C contains a graph 440 with a line 442 showing the integrator voltage $V_{Int}$.

It is assumed here that the high-energy event occurs at 650 µs, and the event is quickly detected by the energy event detector 218. The clamping of the inputs of the amplifier 214 by the switchable clamp 220 helps to prevent significant propagation of the excessive electrical charge to the integration capacitor 204. Propagation delay (such as about 1.5 ns) may allow some small event charge to become integrated by the integration capacitor 204, but that amount is small. Moreover, the ripple on the reverse bias of the photodetector 202 can be small (such as less than 1 mV), and any upset from the high-energy event subsides very quickly (such as after about 1 µs).

Figure 5:
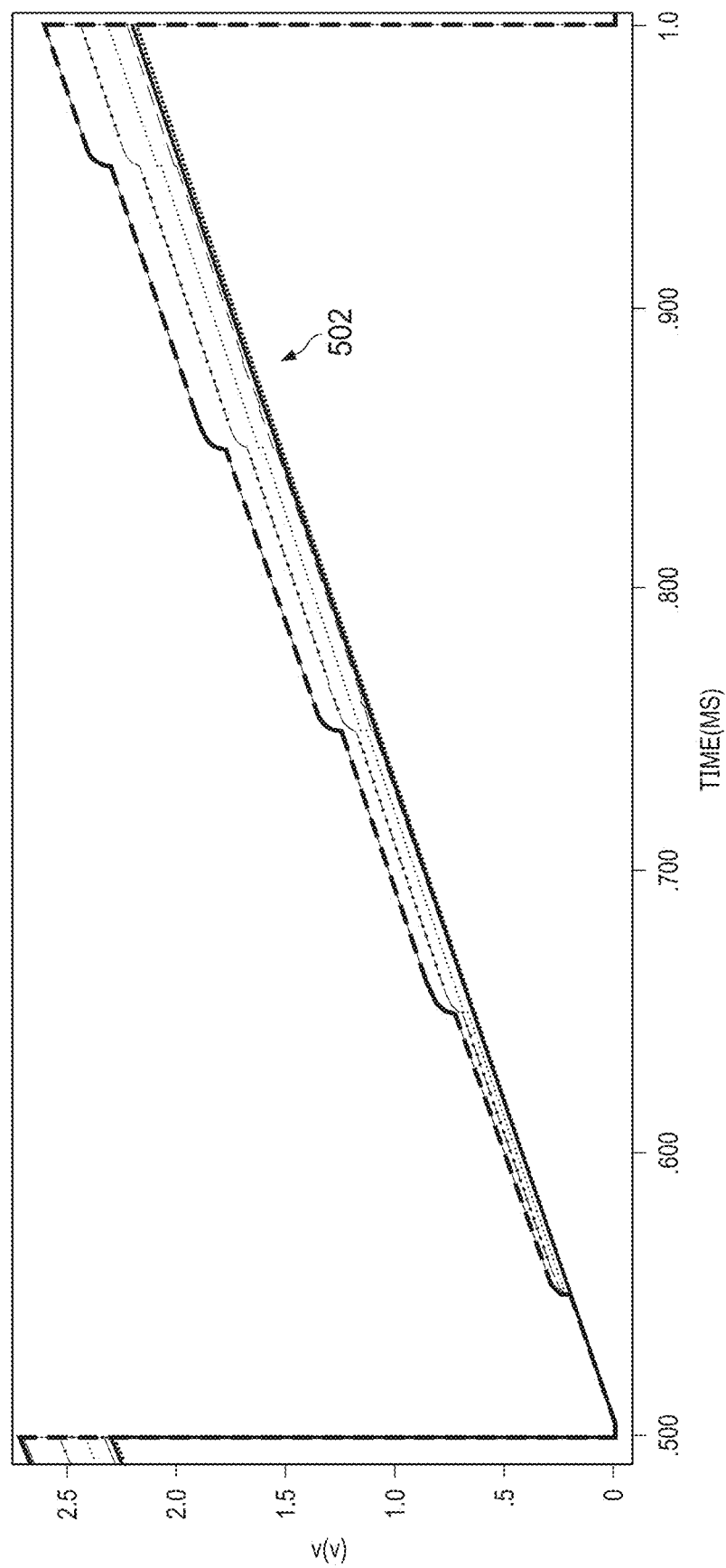
FIG. 5 illustrates third example results obtained using high-energy suppression for at least one infrared imager or other imaging device according to this disclosure.

FIG. 5 illustrates third example results obtained using high-energy suppression for at least one infrared imager or other imaging device according to this disclosure. More specifically, FIG. 5 illustrates an example graph 500 with lines 502 showing integrator voltage $V_{Int}$ generated in the circuit 200 during different high-energy events of different energy levels, namely events between 500 e⁻ and 5 Me⁻. As can be seen here, there may be some bleed-through of energy as a result of the delay in the operation of the energy event detector 218, but the integrator voltage $V_{Int}$ does not increase excessively during the high-energy events. Moreover, no de-biasing effects are visible here.

Although FIGS. 3A through 5 illustrate examples of results obtained using high-energy suppression for at least one infrared imager or other imaging device, various changes may be made to FIGS. 3A through 5. For example, the results shown here may be obtained via simulation of the operation of the circuit 200. The operations of any actual implementation of the circuit 200 may vary from those shown here, such as based on how various components of the circuit 200 are implemented.

Figure 6:
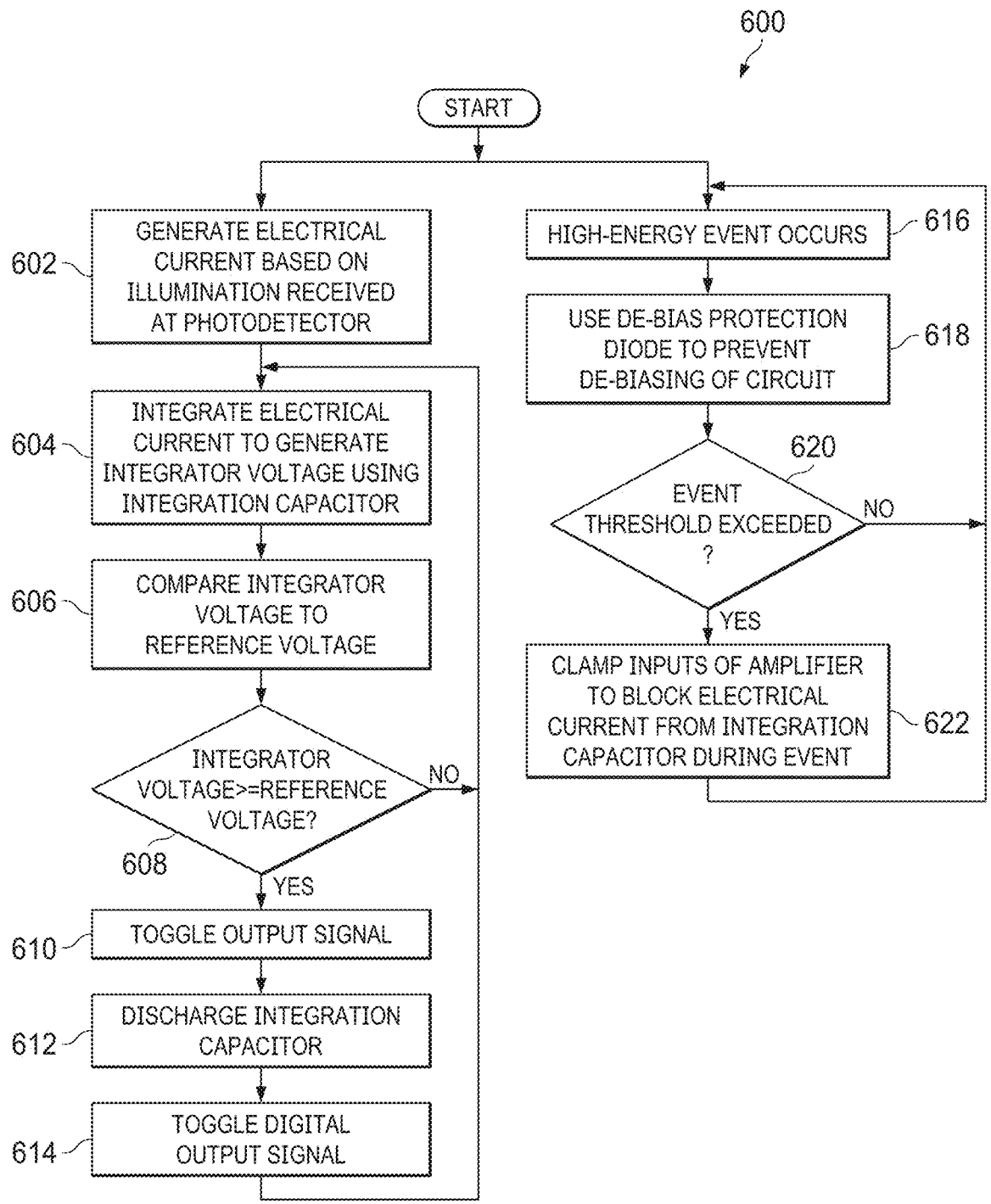
FIG. 6 illustrates an example method for high-energy suppression for at least one infrared imager or other imaging device according to this disclosure.

FIG. 6 illustrates an example method 600 for high-energy suppression for at least one infrared imager or other imaging device according to this disclosure. For ease of explanation, the method 600 is described as being performed using the circuit 200 of FIG. 2 in the system 100 of FIG. 1. However, the method 600 may be performed using any other suitable circuit and in any other suitable system.

As shown in FIG. 6, an electrical current is generated based on illumination received at a photodetector at step 602. This may include, for example, the photodetector 202 generating an electrical current based on received illumination. The electrical current is integrated using an integration capacitor to generate an integrator voltage at step 604. This may include, for example, the integration capacitor 204 generating an integrator voltage $V_{Int}$ based on the electrical current from the photodetector 202 that passes through the transistor switch 212. The integrator voltage is compared to a reference voltage at step 606. This may include, for example, the comparator 208 comparing the integrator voltage $V_{Int}$ to a reference voltage $V_{Ref}$. A determination is made whether the integrator voltage meets or exceeds the reference voltage at step 608. If not, the process returns to step 604, where the electrical current from the photodetector 202 can be used to continue charging the integration capacitor 204.

Otherwise, if the integrator voltage meets or exceeds the reference voltage, a digital output signal is toggled at step 610, and the integration capacitor is discharged at step 612. This may include, for example, the comparator 208 toggling the output signal 210 based on the result of the comparison. This may also include the toggled output signal or another signal causing the switch 206 to close in order to discharge the integration capacitor 204. Eventually, the digital output signal is toggled again at step 614. This may include, for example, the comparator 208 toggling the output signal 210 again based on the integrator voltage $V_{Int}$ falling below the reference voltage $V_{Ref}$. The process returns to step 604, where the electrical current from the photodetector 202 may be used to charge the integration capacitor 204 again. This process may continue until an image capture or other operation is completed.

During these operation of the circuit, a high-energy event may occur at step 616. This may include, for example, a high-energy laser beam, nuclear radiation, or other energy striking the circuit 200. A de-bias protection diode is used to prevent de-biasing of the circuit at step 618. This may include, for example, using the de-bias protection diode 216 coupled to the output of the amplifier 214 to prevent the output of the amplifier 214 from skewing too much, which might otherwise allow the regulation loop that includes the amplifier 214 to fail. If the energy of the event exceeds a threshold at step 620, the inputs to the amplifier are clamped to block the electrical current generated by the photodetector from reaching the integration capacitor during the event (or during a substantial portion thereof) at step 622. This may include, for example, the event detector 218 detecting the high-energy event exceeding some threshold level and closing the switchable clamp 220. This may also include the amplifier 214 opening the transistor switch 212 as a result of its inputs being coupled together in order to prevent the electrical current generated by the photodetector 202 (or the bulk thereof) from reaching the integration capacitor 204. Once the event passes, the switchable clamp 220 can be opened to resume normal operation of the circuit 200. Note that one or multiple high-energy events may occur during operation of the circuit 200.

Although FIG. 6 illustrates one example of a method 600 for high-energy suppression for at least one infrared imager or other imaging device, various changes may be made to FIG. 6. For example, while various steps are shown in FIG. 6 as being performed in series and in parallel, various steps in FIG. 6 may occur in any other suitable serial and/or parallel combination. Also, various steps in FIG. 6 may occur in a different order. In addition, it is assumed in FIG. 6 that the circuit 200 includes the de-bias protection diode 216 and the energy event detector 218 and switchable clamp 220. However, the de-bias protection diode 216 may be used in a circuit without the energy event detector 218 and switchable clamp 220, or the energy event detector 218 and switchable clamp 220 may be used in a circuit without the de-bias protection diode 216.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a photodetector configured to generate an electrical current based on received illumination;
   an integration capacitor configured to integrate the electrical current and generate an integrator voltage;
   an amplifier configured to control a transistor switch coupled in series between the photodetector and the integration capacitor;
   an event detector configured to sense a high-energy event affecting the photodetector;
   a switchable clamp coupled across inputs of the amplifier, the event detector configured to close the switchable clamp in response to sensing the high-energy event; and
   a de-bias protection diode coupled to an output of the amplifier and to a gate of the transistor switch, the de-bias protection diode configured to limit a skew of a signal generated by the amplifier for the gate of the transistor switch.

2. The apparatus of claim 1, wherein the event detector is configured to close the switchable clamp in order to prevent at least some of the electrical current generated by the photodetector during the high-energy event from being provided to the integration capacitor.

3. The apparatus of claim 1, further comprising:
   a comparator configured to generate an output signal based on whether the integrator voltage meets or exceeds a reference voltage.

4. The apparatus of claim 1, further comprising:
   a capacitor coupled between the event detector and the photodetector.

5. The apparatus of claim 1, wherein the de-bias protection diode is configured to limit movement of a regulation loop for the photodetector out of regulation during the high-energy event, the regulation loop including the amplifier.

6. The apparatus of claim 1, wherein the event detector is configured to close the switchable clamp in order to maintain a desired reverse bias voltage on the photodetector during the high-energy event.

7. An apparatus comprising:
   a photodetector configured to generate an electrical current based on received illumination;
   an integration capacitor configured to integrate the electrical current and generate an integrator voltage;
   an amplifier configured to control a transistor switch coupled in series between the photodetector and the integration capacitor;
   an event detector configured to sense a high-energy event affecting the photodetector; and
   a switchable clamp coupled across inputs of the amplifier, the event detector configured to close the switchable clamp in response to sensing the high-energy event;
   wherein the event detector is configured to close the switchable clamp in order to maintain a desired reverse bias voltage on the photodetector during the high-energy event.

8. The apparatus of claim 7, further comprising:
   a de-bias protection diode coupled to an output of the amplifier and to a gate of the transistor switch, the de-bias protection diode configured to limit a skew of a signal generated by the amplifier for the gate of the transistor switch.

9. The apparatus of claim 8, wherein the de-bias protection diode is configured to limit movement of a regulation loop for the photodetector out of regulation during the high-energy event, the regulation loop including the amplifier.

10. A system comprising:
    a focal plane array comprising multiple optical detectors;
    wherein each of the optical detectors comprises:
      a photodetector configured to generate an electrical current based on received illumination;
      an integration capacitor configured to integrate the electrical current and generate an integrator voltage;
      an amplifier configured to control a transistor switch coupled in series between the photodetector and the integration capacitor;
      an event detector configured to sense a high-energy event affecting the photodetector;
      a switchable clamp coupled across inputs of the amplifier, the event detector configured to close the switchable clamp in response to sensing the high-energy event; and
      a de-bias protection diode coupled to an output of the amplifier and to a gate of the transistor switch, the de-bias protection diode configured to limit a skew of a signal generated by the amplifier for the gate of the transistor switch.

11. The system of claim 10, wherein, in each of the optical detectors, the de-bias protection diode is configured to limit movement of a regulation loop for the photodetector out of regulation during the high-energy event, the regulation loop including the amplifier.

12. The system of claim 10, wherein, in each of the optical detectors, the event detector is configured to close the switchable clamp in order to prevent at least some of the electrical current generated by the photodetector during the high-energy event from being provided to the integration capacitor.

13. The system of claim 12, wherein, in each of the optical detectors, the event detector is configured to close the switchable clamp in order to maintain a desired reverse bias voltage on the photodetector during the high-energy event.

14. The system of claim 10, wherein each of the optical detectors further comprises:
 a comparator configured to generate an output signal based on whether the integrator voltage meets or exceeds a reference voltage.

15. The system of claim 10, wherein each of the optical detectors further comprises:
 a capacitor coupled between the event detector and the photodetector.

16. The system of claim 10, further comprising:
 a data processing system configured to process output signals from the focal plane array and generate one or more images of a scene.

17. A method comprising:
 generating an electrical current based on received illumination using a photodetector;
 integrating the electrical current to generate an integrator voltage using an integration capacitor;
 controlling a transistor switch coupled in series between the photodetector and the integration capacitor using an amplifier;
 sensing a high-energy event affecting the photodetector;
 in response to sensing the high-energy event, closing a switchable clamp coupled across inputs of the amplifier; and
 limiting a skew of a signal generated by the amplifier for a gate of the transistor switch using a de-bias protection diode coupled to an output of the amplifier and to the gate of the transistor switch.

18. The method of claim 17, wherein the de-bias protection diode limits movement of a regulation loop for the photodetector out of regulation during the high-energy event, the regulation loop including the amplifier.

19. The method of claim 17, wherein closing the switchable clamp prevents at least some of the electrical current generated by the photodetector during the high-energy event from being provided to the integration capacitor.

20. The method of claim 19, wherein closing the switchable clamp maintains a desired reverse bias voltage on the photodetector during the high-energy event.

\* \* \* \* \*